(12) United States Patent
Vanderheiden et al.

(10) Patent No.: US 6,624,803 B1
(45) Date of Patent: Sep. 23, 2003

(54) INTERFACE FOR ELECTRONIC DEVICES PROVIDING IMPROVED ACCESS FOR PEOPLE WITH DISABILITIES

(75) Inventors: Gregg C. Vanderheiden, Madison, WI (US); Christopher M. Law, Madison, WI (US); David P. Kelso, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 09/527,509

(22) Filed: Mar. 16, 2000

Related U.S. Application Data

(63) Continuation-in-part of application No. 09/332,676, filed on Jun. 14, 1999, now Pat. No. 6,384,743, which is a continuation of application No. 08/608,370, filed on Feb. 28, 1996, now Pat. No. 6,049,328, which is a continuation-in-part of application No. 08/546,012, filed on Oct. 20, 1995, now abandoned.

(51) Int. Cl.[7] .................................................. G09G 5/00
(52) U.S. Cl. ....................... 345/156; 345/168; 345/172; 341/22
(58) Field of Search ................................. 345/156, 727, 345/157, 172–174, 177, 701–710, 168, 169; 340/825.19, 407.1; 341/21, 22

(56) References Cited

U.S. PATENT DOCUMENTS 5,461,399 A * 10/1995 Cragun .................. 340/825.19
6,046,722 A * 4/2000 McKiel, Jr. .................. 345/157
6,111,562 A * 8/2000 Downs et al. ............... 345/727
6,140,913 A * 10/2000 Okada et al. ............. 340/407.1

OTHER PUBLICATIONS

JAWS for Windows Quick Reference Guide, dated Dec. 5, 1995.*

New Features, JAWS 2.2, dated Jan. 1992.* http://www.nfbnet.org/files/Blcom.Htm.*

* cited by examiner

Primary Examiner—Dennis-Doon Chow
(74) Attorney, Agent, or Firm—Quarles & Brady LLP

(57) ABSTRACT

A reduced button set control panel provides control of electronic devices in parallel with standard controls of the device. This permits improved access to the functions of the electronic devices for users who may be disabled. Functions invocable by conventional controls are mapped to one or more lists which may be navigated through by means of up and down arrows or enabled by means of an access control button of the reduced button set control panel. Thus as few as three buttons may allow a wide variety of control of different pieces of equipment. The access button may be further invoked to activate a second modality to the conventional controls in which their functions are not invoked when these controls are pressed but instead descriptions of the operations of the controls is provided. These descriptions may be layered so that as successive invocations occur, additional information is provided to the user but not to users who do not require it.

20 Claims, 8 Drawing Sheets

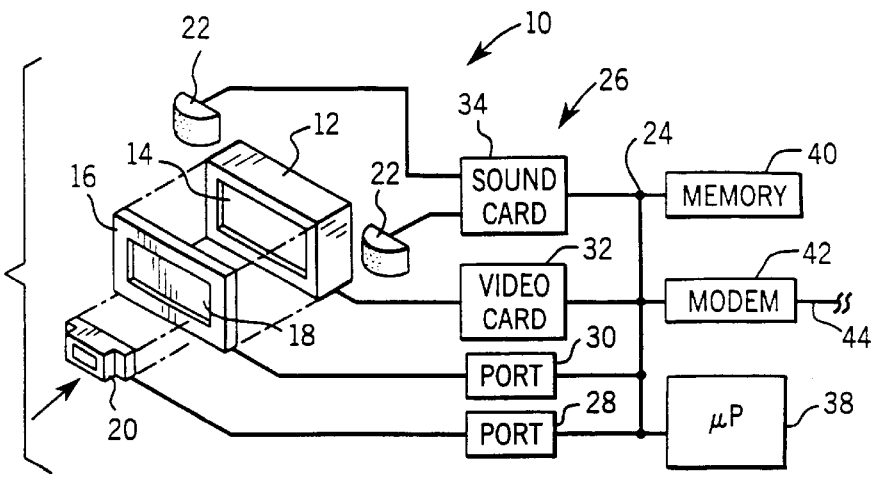
FIG. 1
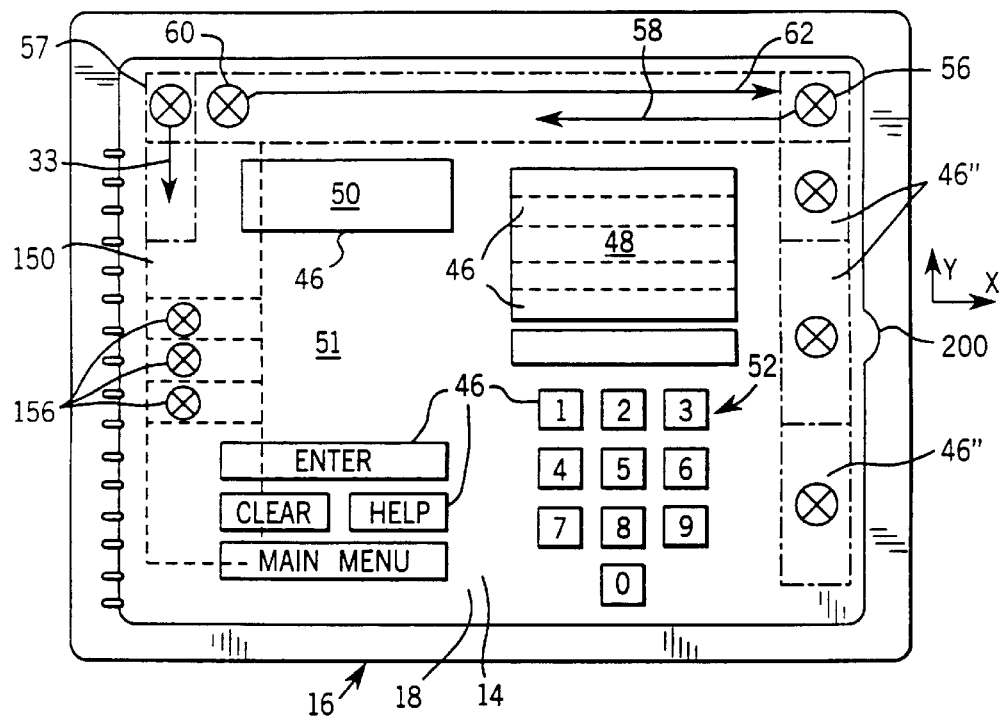
FIG. 2
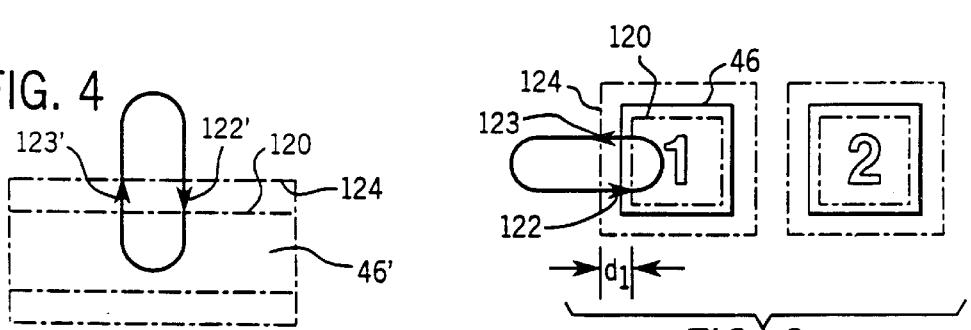
FIG. 4
FIG. 3

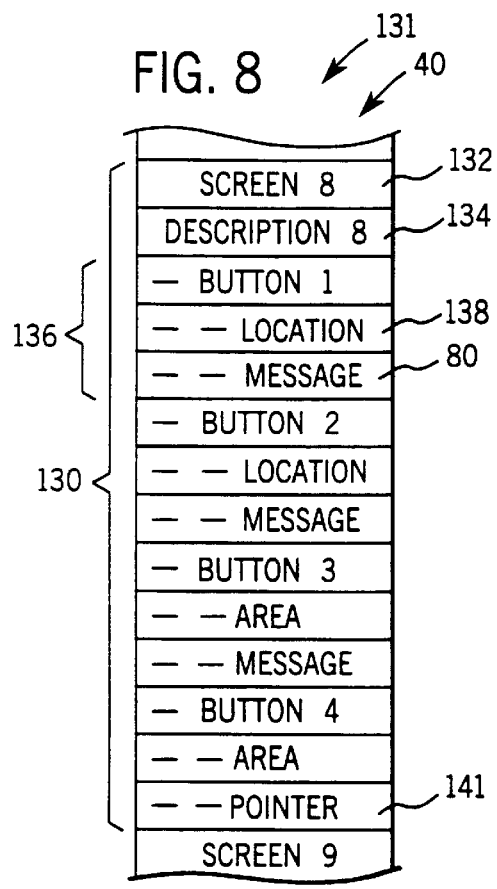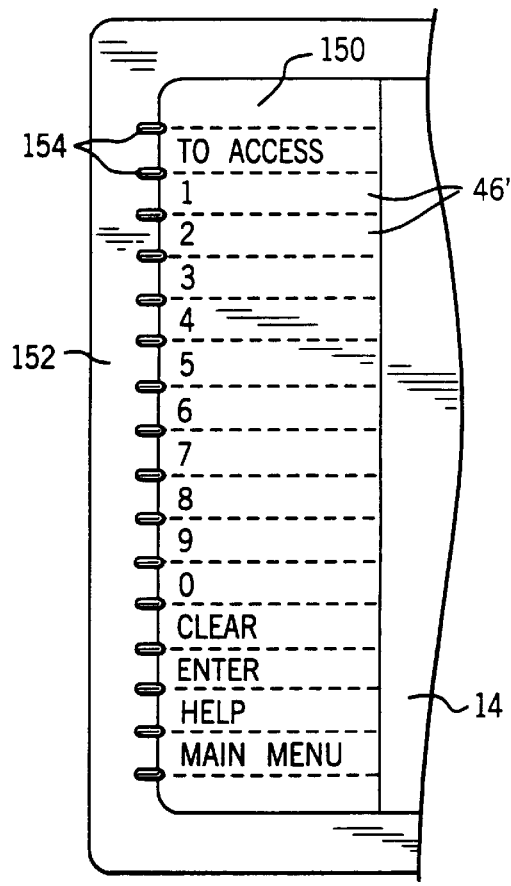

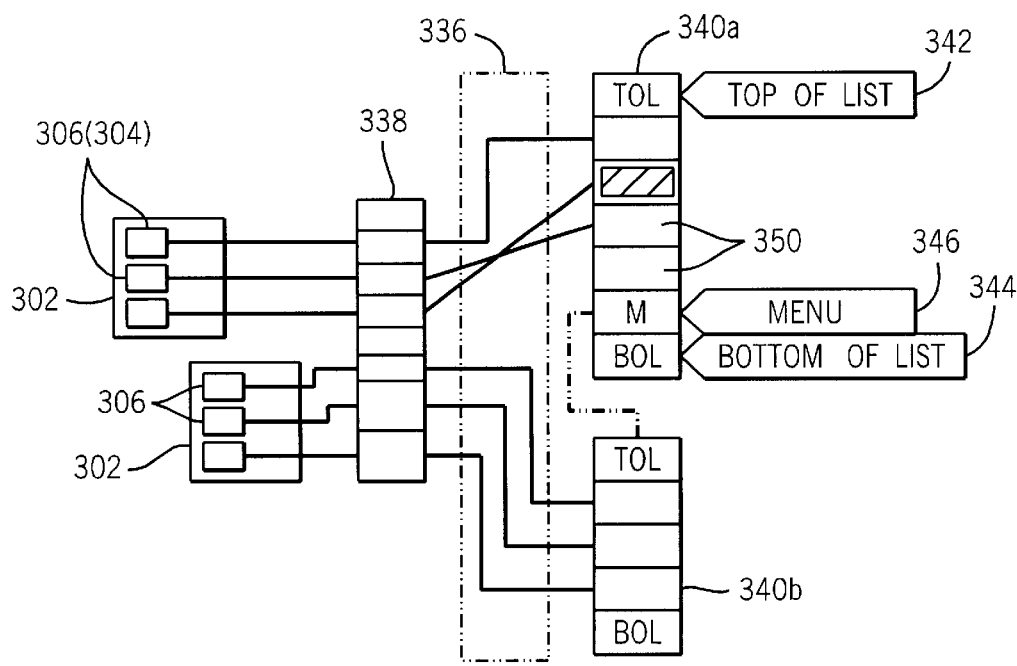
FIG. 16
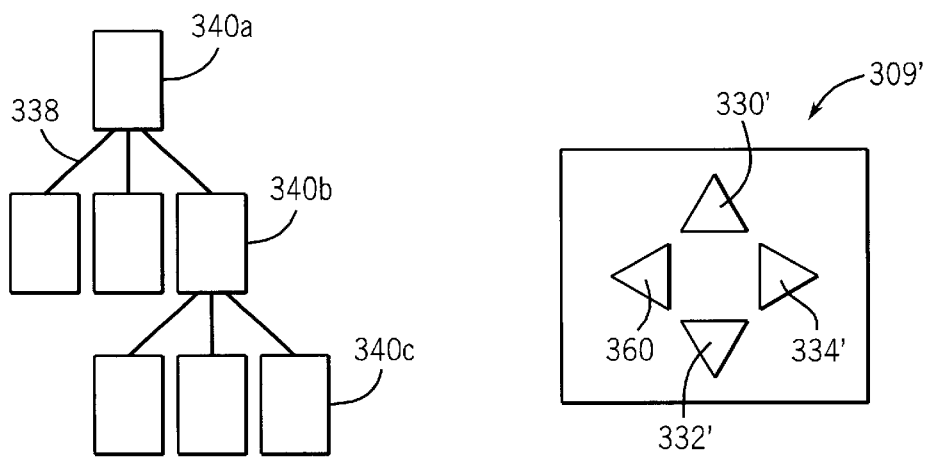
FIG. 17
FIG. 18

INTERFACE FOR ELECTRONIC DEVICES PROVIDING IMPROVED ACCESS FOR PEOPLE WITH DISABILITIES

CROSS-REFERENCE TO RELATED APPLICATIONS

This application is a continuation-in-part of U.S. application Ser. No. 09/332,676 filed Jun. 14, 1999 now U.S. Pat. No. 6,384,743 which is a continuation of U.S. application Ser. No. 08/608,370 filed Feb. 28, 1996 now U.S. Pat. No. 6,049,328 which is a continuation-in-part of U.S. application Ser. No. 08/546,012 filed Oct. 20, 1995 now abandoned.

STATEMENT REGARDING FEDERALLY SPONSORED RESEARCH OR DEVELOPMENT

- - -

BACKGROUND OF THE INVENTION

The invention relates generally to human-machine interfaces (HMI's) and in particular to a dual mode interface for electronic devices providing improved access to the functions of those devices for people with disabilities.

The electronic touch screen is representative of current innovative HMI's for electronic devices. With a touch screen, the user enters data by touching virtual buttons displayed on the computer display.

With a touch screen system, the type, size, and number of the virtual buttons may be readily changed by changing the computer's program without changes in the associated hardware. Thus, the touch screen system offers a user-interface that may be flexibly tailored to a particular application. The ability to divide virtual buttons among different screens and to display only those screens needed by the user's particular task can simplify data entry. The combination of text and graphical elements on the screen along with the virtual buttons can help to further guide the user through the steps of data input.

Normally, a touch screen system uses a touch screen panel which is placed directly over the viewing area of a standard computer display, for example, a CRT or a liquid crystal display ("LCD"). The touch screen panel provides a signal to a computer associated with the computer display indicating where on the surface of the display a stylus or finger is placed. This signal may be generated, for example, by acoustic systems detecting absorption of sound by a finger on the surface of the display or by systems using crossed beams of infrared light arrayed along x and y axes which are broken by the finger, or by laminated transparent electrodes which are physically compressed against each other to provide a point electrical contact that may be interpreted as an x and y coordinate.

Frequently a touch screen will be used with a computer contained within a device to be used by the public. The computer may have so-called multi-media capabilities providing both a visual and audio program intended to help members of the public obtain information or directions.

Despite the advantage of touch screen systems in such applications, like many novel interface controls, they present a barrier to many people with disabilities. Those with impaired vision perceive only the featureless surface of the display screen knowing that it may contain one or more virtual buttons of arbitrary placement and functions. Those unfamiliar with the language of the legends on the buttons or those who cannot read, are also foreclosed from much of the information presented by touch screen systems. Critical audio information in multi-media presentations will not be received by deaf users. Those with limited mobility may be unable to reach or operate the touch screen surface.

The predecessor applications to this application describe techniques for helping those with disabilities use a touch screen system. Similar barriers can be presented by other human machine interfaces where an ability to discern the pattern and purpose of the buttons (physical or virtual) requires high visual acuity and where operation of the buttons can require a high degree of mobility.

It would be desirable to find a method of making a wide variety of electronic devices more accessible to people with disabilities.

BRIEF SUMMARY OF THE INVENTION

The present invention provides an HMI allowing a variety of electronic devices to be more accessible to a larger segment of the population. Generally, it does this by abstracting the control functions of the electronic device and special accessibility features into a standard set of buttons with recognizable orientation and standard operation and exposing this reduced button set control to the user in parallel with standard controls of the electronic device.

For this purpose, the conventional controls of the electronic device are mapped to a virtual list whose elements may be selected by two "up" and "down" buttons and activated by a third "access" button when it is released. The access button further operates when it is pressed in conjunction with an activation of a conventional control to provide an explanation of the function, operation or context of the conventional control. The selection and activation of elements on the virtual list can be accompanied by a spoken description and the explanation of the function can be via a spoken descriptions and or via display of the text in a larger font. In this way, a simple subset of controls can allow access to electronic devices having an arbitrary array of standard controls, either though use of the controls as augmented by the access-button invoked explanations or by dispensing with the standard control and navigating through the virtual list. The reduced button set including the access button, operating in addition to the standard controls, may be placed to be better reached and activated by those with decreased mobility.

Specifically then, the present invention provides an interface systems for an electronic device, the electronic device having a first set of electronic controls and a second set of electronic controls, the latter comprising an access switch, and up switch and a down switch. An electronic computer communicating with the first and second sets of electronic controls executes a stored program to respond to activation of ones of the first set of electronic controls to invoke functions of the electronic device. Activation of ones of the first set of electronic controls with activation of the access button provides information about the function invoked by the activated ones of the first set of electronic controls. The electronic computer further maps the functions of the electronic device invocable by the first set of electronic controls to list elements of a virtual list having a top and bottom. The program causes the computer to respond to the activation of the access switch to invoke a selected function of the virtual list and respond to the up switch and the down switch to change the selected function of the virtual list upward or downward.

Thus it is one object of the invention to provide a simple interface applicable to a wide variety of electronic devices that may increase their accessibility both to individuals with disabilities and to the general population.

It is another object of the invention to provide an interface that may be standardized and yet work for many different types of electronic devices.

The electronic computer may operate to respond to activation of the up or down switch to notify the user of a changed selected function. The notification may be, for example, in the form of spoken words.

It is another object of the invention to provide an interface to electronic devices that does not demand that the user have a high degree of visual acuity.

The access switch maybe a pushbutton and the electronic computer may be further operated to define activation of the access switch as release of the pushbutton.

Thus it is another object of the invention to allow a single access button to serve double duty both in invoking functions when it is released and for a secondary purpose, for example, in providing help or guidance on the other controls when it is depressed.

The virtual list may include a top delimiter list element at the top of the virtual list and/or a bottom delimiter list element at the bottom of the virtual list, respectively. The electronic computer may further operate such that the top and bottom delimiters are not invocable by the first set of controls (and thus do not correspond to normal device functions) but are invocable by the access button when selected to provide an indication of the location of the selection at the top or bottom of the virtual list.

Thus it is another object of the invention to provide "phantom" functions that allow improved navigation through functions of the electronic device when using the access buttons.

The electronic computer may operate so that pressing the up button when the selection is at the top delimiter or selecting the down button when the selection is at the bottom delimiter causes the selection to roll over to the bottom or top, respectively, only after an acknowledgment signal by the user. That acknowledgment signal may, for example, be a pressing of the access button.

Thus it is another object of the invention to prevent inadvertent rollover of the list such as may be confusing in operation of the device.

The present invention also provides an improved method of providing instructions on operation of the controls of the electronic device in the form of "layered" help messages. This layered help system provides a second functionality to the electronic controls so that they operate normally when the access button is not pressed but when the access button is pressed to provide a description of the underlying function and its invocation is offered. Thus by pressing the access button and trying other electronic controls, a recitation of their function may be provided without activation the electronic device. In this way, the user may establish the layout of the various controls simply by trying them without adverse consequence.

Different users' need for different levels of help is acknowledged through a layering process which responds to a first activation of a control with concurrent activation of the access button provides a first spoken "help" message (e.g., the name of the control, its context, status and other information) while later activations of the control (prior to deactivation of the access button) provide a second different messages elaborating, in some respect, on the first spoken message. The help messages may also be displayed on a screen or the like. This process may be continued for subsequent activations of the button while the access button has not been released.

Thus it is another object of the invention to provide for an efficient audiovisual help system that accommodates both experienced users and those who wish additional assistance without unduly encumbering either.

The spoken messages may describe a name of the activated control and summary state of the operation of the activated control, or a function of the activated control and a detailed state of the operation of the activated control, or how the activated control is used, or special instructions related to the activated control, or a list of related controls or reference to a user manual page number. These notifications may optionally be provided sequentially in the order given.

Thus it is another object of the invention to provide increasing information about the function of the button organized according to the likelihood of its being valuable to the user.

The foregoing and other objects and advantages of the invention will appear from the following description. In the description, reference is made to the accompanying drawings which form a part hereof and in which there is shown by way of illustration, a preferred embodiment of the invention. Such embodiment does not necessarily represent the full scope of the invention, however, and reference must be made therefore to the claims herein for interpreting the scope of the invention.

BRIEF DESCRIPTION OF THE DRAWINGS

FIG. 1 is a simplified blocked diagram of a typical multimedia touch screen system such as may be used in a kiosk showing the position of the touch panel in front of a display screen with a separate access button positioned at the bottom of the screen;

FIG. 2 is a front elevation view of the display screen of FIG. 1 showing an example set of virtual buttons together with particular touch points and trajectories associated with features of the invention;

FIG. 3 is an enlarged detail from FIG. 2 showing a touch path across a particular virtual button and the expansion and contraction of the button boundary depending on the direction of the trajectory o the touch point;

FIG. 4 is a figure similar to that of FIG. 3 showing two button boundaries different only in vertical dimension for a non-displayed speed list button;

FIG. 8 is a representation of a table contained in memory defining each virtual button displayed on display screen;

FIG. 9 is a detailed enlargement of the screen of FIG. 2 showing a speed list made visible together with embossments providing ready access to the list members;

FIG. 16 is a schematic representation of the operation of the processor of FIG. 14 in mapping various functions and buttons to a virtual list to be accessed by the reduced button set access panel of FIG. 15;

FIG. 17 is a graphical representation of the arrangement of the virtual list of FIG. 16 into multiple virtual sub lists arranged in a hierarchy; and FIG. 18 is a figure similar to that of FIG. 15 showing an alternative embodiment of the reduced button set access panel.

DETAILED DESCRIPTION OF THE INVENTION

Touch Screen Embodiment

Figure 5:
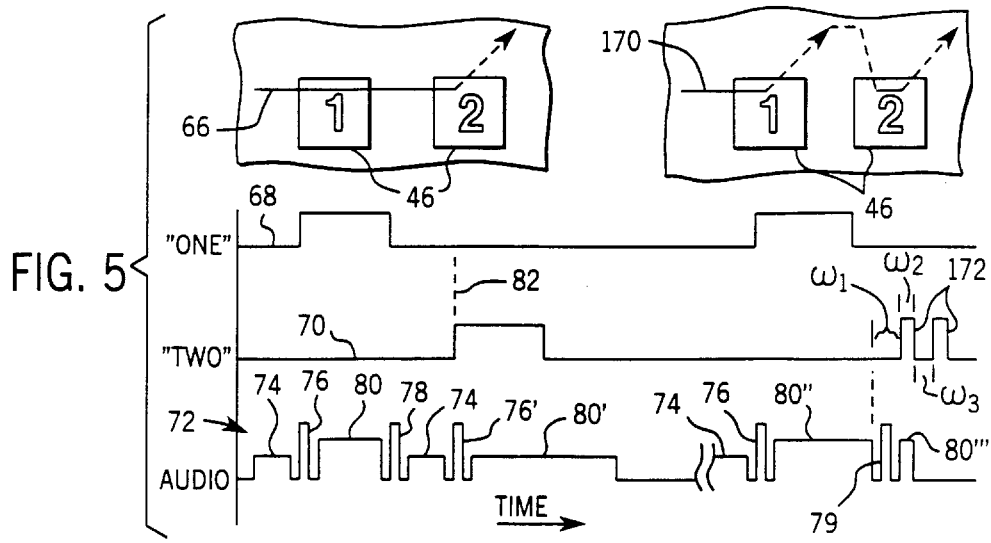
FIG. 5 is a timing diagram showing the generation of audio ridge signals, background sound, and spoken messages as a touch point moves across virtual buttons.

Referring now to FIG. 1, in an embodiment described in a predecessor application to the present application, on which the present application relies in part, a touch screen system 10 includes an electronic display 12 having a generally planar and rectangular display area 14 on which text and graphics may be displayed. Such displays 12 are well known in the art and may make use of a cathode ray terminal ("CRT") or a liquid crystal display ("LCD").

Positioned in front of the display area 14 is a touch panel 16 having an active area 18 commensurate in size with the display are 14. The display area 14 may be seen through the active area 18, and user touching the display area 14 with a finger or stylus (not shown) must pass the finger or stylus first through the active area 18. Touch panels 16 are also well known in the art and may employ a number of different technologies, including those employing crossed beams of infrared light (which detect the finger by the interruption of one or more beams), and those employing layered transparent electrodes (which detect the finger by its deforming the layers and causing the electrodes to touch).

Preferably, in the present invention, the touch panel 16 provides a high-resolution X-Y coordinate signal indicating the position of the finger on the display area 14, and "no stylus signal when the finger is removed. Thus, the location of a touch point of a finger against the display area 14 can be accurately assessed.

An access button 20, being a single-pole single-throw momentary push button switch is mounted near the touch panel 16 in a prominent and uniform location to be accessible to an individual with sight impairment. Access button 20 has a distinctive look and shape and is large to also be easily located by individuals with undetermined disabilities. For blind users, a Braille legend contained within a Braille field 202 (shown in FIG. 10) identifies the button as an access button. Ideally, such a button has a standard shape and color and thus may serve as an identifier for a standard operation of an access screen 200 as will be described.

Although the preferred embodiment contemplates a separate physical push-button it will be apparent from the following description that the access button 20 may in fact be a readily located portion (or the entire face) of the touch screen or may be other forms of non-mechanical switch, such as a capacitive switch, so long as it is easily located. Flanking the display 12 are one or more speakers 22 directed toward the user of the touch screen system 10 so that the user may hear speech and tone generated by the speakers 22. Each of the various components 12, 16, 20 and 22 are connected to an internal computer bus 24 by commercially available adapter cards 26. It will be understood in the following description that the functions of the electronic computer may be met by discrete circuitry including custom integrated circuits and by computer and interface electronic systems often termed "controllers". As used herein the term computer should be held to cover all these possibilities. The access button 20 is connected to the bus 24b a standard mouse or keyboard port 28 whereas a serial port 30 receives the signal from the touch screen. A video card 32 provides the interface between the bus 24 and the display 12 and a sound card 34 provides an interface between the computer bus 24 and the speakers 22. The sound card 34 may include an on-board amplifier, to provide sufficient volume to the speakers 22, and may include a standard FM synthesizer chip as well as a digital-to-analog converter ("DAC") for synthesizing arbitrary wave forms from a stored sound look up table. This latter feature permits, for example, generating spoken words from text according to readily available speech synthesis software.

Also attached to the computer bus 24 is a microprocessor 38 and associated computer memory 40 for holding a stored program executed by the microprocessor 38 together with variables used in that stored program.

A modem 42 connects the computer bus 24 to a telephone line 44 to provide access to a remote computer, such as a central bank computer if, for example, the touch screen system 10 is used as a remote terminal in an automated teller machine ("ATM") or the like.

Referring now to FIGS. 1 and 2, the microprocessor 38 may display on the display area 14 a number of virtual buttons 46 arranged arbitrarily over the surface of the display area and divided into one or more "screens" displayed on at a time on the display area 14. The virtual buttons 46 are grouped on the display area 14, for example, function, to improve their ease of use. The virtual buttons 46 are also grouped among different screens, for example, to divide the user's interaction the touch screen system 10 into discrete logical stages.

The virtual buttons 46, in their simplest embodiment, are rectangular images containing an alphanumeric label. These images are formed by the video card 32 receiving instructions from the microprocessor 38 which most typically simply relays an image previously stored in memory 40. Virtual buttons 46 may be "pressed" by a user touching the display area 14 (as is detected by the touch panel 16) causing the microprocessor 38 to execute a predetermined set of instructions associated with that button. For example, referring to FIG. 2, the screen includes a keypad 52 composed of number keys from 0 to 9. As each number key is pressed, the microprocessor 38 may, for example, receive and store that number and/or transmit it via modem 42 to a central computer.

As is understood in the art, each virtual button 46 may include a "pressed" and "unpressed" image reflecting its two possible states. A shadow box around the button 46 changes with these different modes to suggest the shading that would be obtained with a real button being depressed or released. Other than the differences between the "pressed" and "unpressed" images, the simplest form of virtual buttons 46 are essentially static, staying in the same place and having the same alphanumeric label on a given screen. Generally, however, a given screen may also include dynamic virtual buttons, for example, a scrolling area 48 of text. The virtual buttons, further, need not look like conventional buttons but may include for example, animated graphical elements that may move across the screen. Scrolling area 4 may be separated into smaller virtual buttons 46 whose location is fixed but whose contents, i.e., the alphanumeric label and the set of instructions executed by the microprocessor 38 change as the display scrolls. In addition, the screen may include printed plain text in a text block 50, which, during non-audio mode (to be described) and unlike the above virtual buttons 46, generally are not pressed to invoke the execution of a set of predetermined instructions by the microprocessor 38. Henceforth the term virtual button will be considered to generally embrace any defined field on the screen in which a touch may be detected. Action virtual buttons will be those which may be activated by a touch to cause the computer to initiate a predefined set of instructions. Thus the text block 50 and the scrolling area 48 are virtual buttons 46.

In a non-audio mode, the microprocessor 38 displays a given screen with its virtual buttons 46 and monitors the X-Y coordinate generated by the touch panel 16 comparing the coordinate against a ma of button locations contained in memory 40 and associated with that particular screen. If a touch point occurs within the outline of a particular virtual button, that button is considered to have been pressed and the microprocessor 38 executes the instructions associate with that button.

In the present invention, an audio mode may be activated in which audio queues are provided to assist the user with some vision impairment. In the preferred embodiment the audio mode is entered by a standard gesture in which a stylus (e.g., a finger or pen) is pressed against the upper right hand corner of the display area 14 at point 56 and drawn leftward at least halfway across the top of the display area 14 as indicated by arrow 58. This gesture is selected to be simple and to start at a readily determinable position on the display area 14 and yet to be unlikely to be accidentally invoked. An opposing gesture, in which the finger is pressed against the upper left hand side of the screen 60 and drawn rightward at least three quarters of the way across the top of the screen as indicated by arrow 62 is used to convert back to a non-audio mode. Canceling the audio mode intentionally thus requires a somewhat greater effort by the user than activating the audio mode so as to prevent accidental cancellation and to allow the user the greatest possible latitude in moving a finger around on the screen.

When the audio mode has been invoked, generally the touch point will be used to trigger audio cues enabling the individual with vision-impairment or the individual who has difficulty reading the information on the touch screen, improved access to the information and capabilities of the touch screen.

In the audio mode of the present invention, the user is provided with audio clues as to the location of the touch point with respect to the defined virtual buttons 46.

Referring now to FIG. 8, the microprocessor 38, evaluates the touch point signal from the touch panel 16, against a table 131 stored in memory 40 and indicating the locations (and sizes) of the virtual buttons 46 and providing a spoke message 80 identifying the button's function. The virtual buttons 46 listed in table 131 are arranged by screens, and each screen is associated with a spoken description 134 describing the general layout of the screen. Thus, the table 131 includes a set of entries 130 for each screen display including a text description 134 of the screen such as may be provided to the sound card 34.

After the audio mode has been invoked, the description 134 of the screen currently displayed by the microprocessor 38 on the display 12 may be played by touching the screen in the upper left hand corner and releasing the touch screen without sliding the finger rightward or downward as indicated by arrows 62 and 33.

The verbal screen description for the screen of FIG. 2, for example, might be:

This screen provides for the withdrawal of money from your account or the determination of an account balance. In the lower right hand corner is a telephone type keypad. Above this keypad is a scrolling menu of different account types including: checking and savings accounts. In the lower left hand corner additional buttons allow the numbers on the keypad to be entered or cleared or invoke a help screen or return you to the main menu. Above these buttons are a text description of this screen.

Referring still to FIG. 8, within the entries 130 for each screen are entries 136 defining the various virtual buttons on the screen by their location of their boundaries 138 and providing a text message 80 usable by the sound card 34 if that virtual button is pressed. The location data includes the necessary information defining an inner and outer boundary of the button (as will be described). The message data 80 is normally the same as that printed in the image of the virtual button 46 but in the case of text block 5 is a short description of the text, for example, "text field so that the user is not burdened with listening to the entire text message corresponding to the printed text within the text block 50. Generally in the audio mode, the microprocessor 38 will identify the screen being displayed and based on a comparison of the touch point to the locations 138 for that screen will play the message 80 associated with that button. As mentioned, when the touch point 57 in the upper left hand corner of the display area 14 is pressed the description 134 associated with that screen will be played.

Consider now the virtual buttons 46 providing number keys 1 and 2 for the keypad 52. The touch point may move in a trajectory 66 from a position to the left of number key 1 in an area not occupied b any other virtual button 46 then across the left most boundary of the generally number key 1 and across the surface of the number key 1 and out of its right boundary into a space not occupied by any other button 46. Continuing the trajectory 66 may cross the left boundary of the number key 2 and prior to exiting the number key 2, the finger may be lifted as indicated by the trajectory 66 becoming dotted.

Each point of the trajectory 66 is associated with an audio queue indicated by audio track 72. Generally for points of the trajectory 66 in the background area 51 outside of any virtual button 46, a background sound 74 is generated. Such a background tone may, for example, be white noise which is perceived as a gentle hissing sound. The purpose of the background sound 74 is to establish that a touch signal on the screen is in fact being generated but not within any virtual button. This is particularly important in some touch screens which require moderate pressure to be activated. The background sound 74 further establishes that the audio mode has been invoked and that the basic hardware is working.

When the trajectory 66 crosses the left most boundary of the number key 1, an audio ridge signal 76 is generated. Any easily recognized tone may be used, however, in the preferred embodiment it is a short duration signal in keeping with its purpose for providing immediate and accurate indication of the crossing of a button boundary.

Conversely when the trajectory passes out of one button, a second audio ridge signal 78 may be generated, preferably having different characteristics than the audio ridge signal 76 so as to allow the user to discern the entry from the exits of a button. For example, audio ridge signal 76 may be a slightly higher pitched tone suggesting a rising or a lifting as might occur if a real button were crossed and audio ridge signal 78 may be a lower pitched tone suggesting a dropping as if the finger or stylus were passing off of an elevated button. The audio ridge signals 76 and 78 may be further varied to indicate the type of virtual button (e.g., to distinguish between keypad buttons and the text block 50).

A spoken message 80, in this case "one", is begun once the trajectory 66 is within the number key 1. Also, in this case, where the trajectory passes out of number key 1 into a background area 51 and then immediately into the number key 2, the message 80 is truncated upon the occurrence of the audio ridge signal 78. Thus if the user is simply "scanning" the surface of the touch screen or is not interested in the remainder of the description of the button 46, the user may simply move the finger further along causing the message of previous virtual buttons 46 to be silenced.

In contrast, if the finger is lifted prior to the crossing out of a button 46, the message continues to play. For example, as trajectory 66 crosses the left most boundary of the number key 2, the audio ridge signal 76' is invoked and a spoken message 80' is provided. When the finger is lifted, for example, at instant 82, the message 80' continues to play to completion. This prevents the user from being confused as to which virtual button 46 was the last button pressed if the user's finger briefly touches another button as it is removed from the screen. In particular, when a finger is used as the stylus, a second button may be inadvertently pressed as the user's finger rolls upward from the touch screen. It has been determined that if the message is truncated on this second button, the user may be confused as to the identity of the last button pressed. In a system where the last button pressed is confirmed by pressing the access button 20, any confusion in the identity of the last button pressed may cause the wrong program to be initiated.

Figure 6:
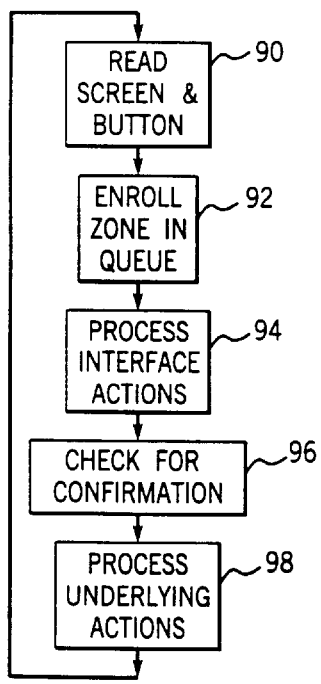
FIG. 6 is a simplified flow chart showing the parsing of touch trajectories into zone changes which affect process actions.

Referring now to FIGS. 1, 3 and 6, the steps taken by the microprocessor 38 in evaluating actions on the touch screen system 10 during the audio mode are broken into three phases. In the first phase, indicated by process block 90, coordinates from the touch panel 16 are received and compared to the locations 138 in table 131 to determine the current state of the touch point as either: in a particular button 46 ("BUTTON") in the background area 51 ("BLANK") o off the screen ("NO TOUCH") indicating that the finger is not touching the touch panel 16.

Next, at process block 92, the particular zone of the touch point is enrolled in a queue so that the immediate history of touch points over time may be determined. For example, if the current state of the touch point is NO TOUCH, the previous state may have been either BUTTON or BLANK with different responses by the microprocessor 38 attaching to each.

Next at process block 94, the microprocessor 38 processes particular interface based on a review of the queue of process block 92. These actions include adjustment of the display 12 and the generation of the audio cues as has been described but not the execution of the underlying actions the buttons normally invoke when pressed in both the audio a non-audio modes.

The text block 50 operates similarly to any other button 46 in their interface actions. When the touch point is within the text zone, a short description of the text message is read. The entire text message is read only when the button selection is confirmed, for example by pressing the access button 20. In the scrolling areas 48 the different zones represent buttons 46 which can announce their contents, however the contents of these buttons 46 generally change as a function of the scrolling. Thus the area in the table 131 normally reserved for the message instead includes a pointer, as is understood in the art, to a separate table (not shown) of scrolled items.

Generally, in the audio mode, the pressing of a button does not immediately invoke the underlying action that pressing the button invoked in the non-audio mode invokes. Instead, that process is broken into two portions, the portion which affects only the display area 14 and the audio cues is separated from the underlying action of the button, for example, the entering of data designated by that button. This two-step process is mediated by the access button 20 which must be pressed to confirm a particular action. Thus, the user's finger or stylus is free to wander about the display area 14 to identify the location and functions of the various buttons without fear of activating those buttons. When the access button is pressed, the message 80 of the selection is repeated as a further confirmation.

At process block 96 the activation of the access button 20 is checked. In a preferred embodiment of the invention, activation of the buttons is accomplished by entering within the boundary of a particular button, as has been described, and pressing the access button 20 prior to leaving that boundary. Generally, the user may first touch a particular button 46 and then lift his or her stylus or finger to press access button 20, or in two-handed operation the user may hold his or her stylus or finger within the button 46 pressing access button 20 with the second hand.

At process block 98, if the access button 20 has been pressed the microprocessor 38 processes the underlying action to that button as if the button had been pressed in the non-audio mode. For text block 50, when the access button is pressed, the full text message of the text block is read.

Figure 7:
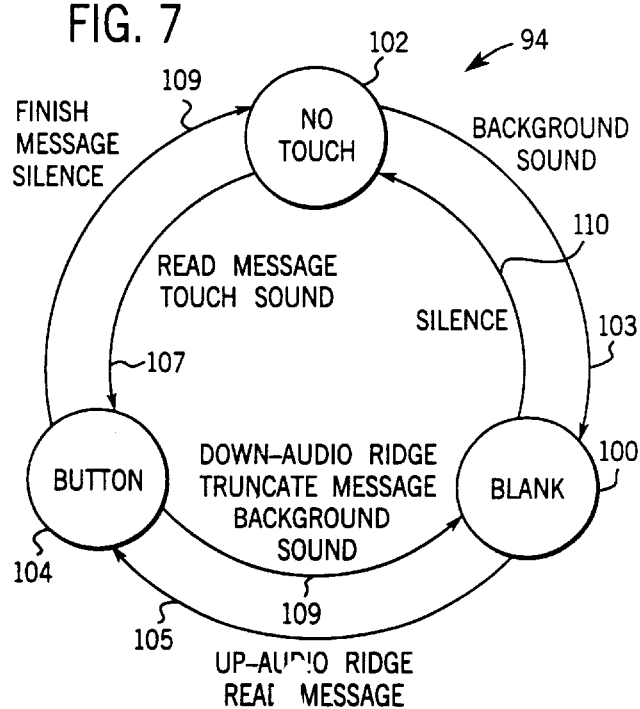
FIG. 7 is a state diagram showing the process actions invoked by various changes in zones of FIG. 6.

Referring now to FIGS. 5 and 7, process block 94 determines the necessary audio actions according to the transition between three states of: NO TOUCH, BLANK, and BUTTON as has been described and as may be determined by the queue established in process block 92 and stored in memory 40. Thus, if the touch point is currently at the BLANK state 100, as determined by process block 90, but was previous in the NO TOUCH state 102, as determined from the queue of process block 92 (a transition indicated by arrow 110), then a background sound 74 is generated to indicate that the touch point is in the background area 51. Similarly, per arrow 109, if the touch point is currently in the BLANK state but was previously in the BUTTON state 104, background sound 74 is generated but also a down direction audio ridge signal 78 is produced and any message in process is truncated. If the access button 20 is pressed, upon reaching the BLANK state the last button entered in the preceding BUTTON state is selected.

If the current state as determined at process block 90 is the BUTTON state 104 indicating that a touch point is within the boundary of a button 46 and if previously the touch point was in the BLANK state 100 (per arrow 105) then an up audio ridge signal 76 is generated and message 80 corresponding to the label of the button 46 is read. In contrast if the BUTTON state 104 is arrived at from the NO TOUCH state 102 (as indicated by arrow 107) the message 80 is read and a touch sound 79 is provided (indicating that the touch panel 16 has registered the touch and shown in FIG. 5), however, no up audio ridge signal 76 is generated.

Finally if the NO TOUCH state 102 is the current state but the previous state was the BUTTON state 104 (per arrow 119) any message 8 is finished and the sound card 34 generates no sound. If however the NO TOUCH state 102 is reached by a previous BLANK state 100, then only no sound is generated as indicated by arrow 110.

Referring now to FIGS. 2 and 3, as has been described, the ability to accurately delineate the edges of the virtual buttons 46 c as to permit the user to obtain a sense of their spatial layout is provided by the audio ridge signal 76, 78 at the boundary of the button 46 separate from the message 80 provided by the button. Although it is desirable that the audio ridge signal 76 or 78 for the edge of the button be sensitive to small changes in the position of touch point so that there is sense of sharp line where the button begins, Nevertheless it is also important to prevent confusing multiple triggering or chatter of the audio ridge signals 76 and 78 or message 80 at the boundary of the button. Such multiple triggering may be caused by a touch point that straddles the boundary of the button and hence moves in and out of the boundary to create rapid minor crossing of the boundary. These multiple triggerings (which can also initiate the spoken message 80) clutter the audio channel that is relied on to inform the user with vision-impairment. Accordingly, in the present invention, two boundaries are use to define each button 46. The first inner boundary 120, generally but not necessarily coextensive with the visual boundary of the button 4 may only be triggered by a passage from outside the boundary 120 to inside the boundary 120 as indicated by arrow 123. Crossing boundary 122 invokes the up audio ridge signal 76 referred to in discussion of FIG. 5.

Once boundary 120 has been crossed, the touch point is considered to be within the button 46 and additional crossings of boundary 120 are of no effect until a second larger boundary 124 outside of boundary 126 is crossed going from the inside of boundary 124 to the outside of boundary 124 as indicated by arrow 123. The distance di between boundaries 120 and 124 is selected to be sufficiently large that minor jitter in the movement of the touch point will not cause repeated triggerings of the buttons 46.

When boundary 124 has been crossed from within the boundary to outside of the boundary, a down audio ridge signal 78 is generated and boundary 124 may no longer be triggered by crossing until boundary 120 is again crossed from outside of boundary 120 to inside of boundary 120. Thus, in effect, the boundary of the button moves between boundary 120 and 124 expanding from boundary 120 to 124 when the button is first entered and collapsing to boundary 120 when the button is first exited.

Referring now to FIGS. 2, 4 and 9, although the two dimensional layout of some virtual buttons 46, such as the keypad 52, will be convenient to many users with impaired vision, often the two dimensional layout of the virtual buttons 46 will prove unnecessarily cumbersome to users with impaired vision. In these cases, users with impaired vision will prefer simpler arrangement of the buttons yet as still grouped by different screens. The present invention therefore also provides a speed list that may be invoked by the user touching the upper left hand corner of the screen at point 57 (FIG. 2) and drawing his or her finger downward as indicated by arrow 33. As shown in FIG. 9, the speed list, when displayed, provides duplicates of each virtual button 46, with the duplicate buttons 46 arranged vertically along an edge of a frame 152 surrounding the display area 14. The speed list 150 thus contains a complete set of possible virtual buttons 46 found on the particular screen but arranged to be accessed by moving a finger or stylus upward or downward along a single vertical axes of the left side of the frame 152, the frame 152 which forms a natural channel to guide the finger or stylus. It will be understood that other locations of the speed list 150 are also possible as long as they are easily located.

As each virtual button 46' is invoked, the message 80 associated with the button 46 is played according to the rules previously described. That is, each virtual button 46' has an inner boundary 120' and an outer boundary 124' (which differ only in their vertical dimension) and audio ridge signals 76 and 78 are generated when inner boundary 120'/is crossed vertically going into the boundary 120' as indicated by arrow 123' or when outer boundary 124' is crossed vertically going out of the boundary as indicated by arrow 123'. Small embossments 154 in the left side of the frame 152 adjacent to the display area 14 may be used to locate the virtual buttons 46' to allow rapid scanning upward and downward within the buttons without waiting for the audio queues of the audio ridge signals 76, 78 or the associated messages 80. In all other respects the virtual buttons 46 duplicate the virtual buttons 46 used when the touch screen system 10 is in the non-audio mode.

As shown in FIG. 2 generally the speed list 150 need not be displayed but consists merely of a plurality of touch points 156 in a linear arrangement.

The speed list 150 is updated according to the screen display simply by scanning the table 131 to identify the new buttons and messages available on a given screen. When the speed list 150 is invoked, a separate tone in messages 80 may flag those virtual buttons 46 which may change, for example, by scrolling without a screen change. Whenever the speed list appears or disappears its appearance or departure is announced in keeping with a requirement that all changes in existing displays are announced.

Referring again to FIG. 5, in an alternative embodiment in which access button 20 is not used, confirmation of a given virtual button selection may be made by a sharp double tap 172 on the touch panel 16 timed to occur within certain time windows after the touch panel 16 is no longer touched. For example, with a touch trajectory 170 which passes from the background area 51 to the surface of the number key 1 and then lifts off the screen to tap twice on the screen (e.g., on the center of the number key 2), a confirmation of the number key may occur. In this case the audio track changes from the background sound 74 and then provides an up audio ridge signal 78 and a message 80" prime. Because the touch point is removed from the screen, the message 80 plays to completion. A short double tap 172 on button 2 and then a release is interpreted as a confirmation. The double tap could occur on any surface of the touch panel 16 but must occur within a predetermined time interval $w_1$ after completion of the message 80, the taps must be no longer than a predetermined $w_2$ and must not be separate by more than $W_3$.

This approach eliminates the need for a separate access button 20 but can require a degree of timing that may make it unsuitable for certain situations or users.

It will be recognized that other methods of confirming a selected virtual button 46 may be used including the use of a landmark position on the touch panel 16 to provide a virtual access button, for example, in the lower left hand corner of the display area 14 or the use of pressure sensitive touch panel 16 where a greater pressure or pattern of pressure indicating an intentional touch (e.g. a pressure increase followed immediately by a pressure decrease) may be interpreted to be a confirmation of a particular selection.

Referring again to FIG. 2, as has been described, when the text block 50 is pressed it will begin a recitation of the text within that block if the text is short. If the text printed in the block is long the field name is announced (indicating generally the type of field) and the access button 20 must be pressed (or other confirmation signal provided) for the entire text to be spoken. For long messages it may also be desirable to allow the user to pause, jump forward or jump backward in the message by different increments (e.g., sentence, word, letter etc.) as will be described below. Additional virtual buttons 46" placed along the right most edge of the display area 14 may invoke these features.

In a preferred embodiment, the user moves toward the right side of the screen to locate a reference notch 200 and then touches the screen to invoke a vertical array of buttons 46" like that of the speed list 150. Moving down from the initial point of contact provides audio descriptions of the buttons 46" which allow for the selection of a direction of movement within the spoken message (e.g., forward or backward) and for the increment of movement (e.g., paragraph, sentence, word, and letter). The access button is used to select the direction and increment last touched. With each tap of the screen the message is incremented as selected. If the letter increment is chosen the message is spelled, a capability provided by storing the spoken message and its spelling or by using a text driven speech synthesizer. This same procedure may be used to navigate around in a table contained on the screen. In this case the buttons 46' provide for movement up down left and right.

Access Button Embodiment

Figure 10:
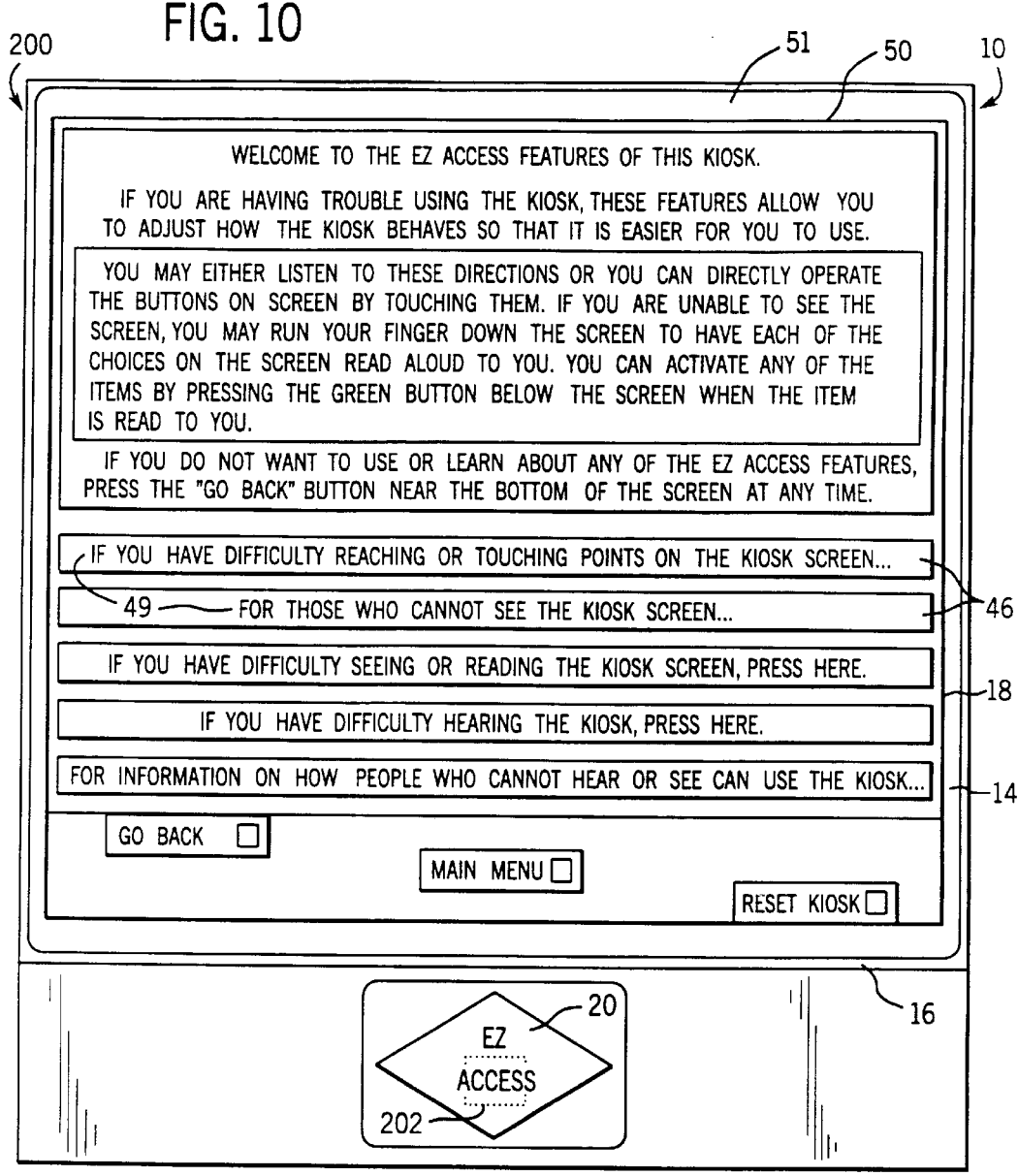
FIG. 10 is a figure similar to that of FIG. 2 showing an access screen for people with disabilities and the positioning of the access button beneath the screen, the screen displaying a set of screen-wide virtual buttons identifying problems of communication for users with disabilities.

The dual requirements of maintaining the advantageous characteristics of the touch screen system 10 in presenting data quickly to users who are not disabled, but to also provide access to the same information by users with disabilities with a minimum of additional effort, are met through the use of an access screen 200 as shown in FIG. 10 and also described in a predecessor application to the present application on which the present application relies in part.

The access screen 200 is displayed by the microprocessor 38 in response to its internal stored program and/or inputs from the user a will be described and is designed to provide multiple paths and methods of communication to users with disabilities so that the touch screen system 10 itself can be used by individuals with disabilities to customize the prospective operation of the touch screen system 10. The ability of the user to customize the touch screen system 10 through the access screen 200 allows the users to select the simplest and most direct touch screen interface that meets their needs.

The access screen addresses the following disabilities: (1) blind individuals, (2) individuals who have difficulty seeing or reading the kiosk, either because the image is not clear or because they cannot interpret the written legends on the screen (this may be result of problems understanding written language or an unfamiliarity with the particular written language or graphic element on the kiosk) (3) individuals who have difficulty hearing, and (4) individuals who have difficulty reaching or touching the kiosk screen, for example, individuals with restricted mobility including those using wheelchairs. The access screen further contemplates use by individuals with combinations of disabilities including those who cannot hear or see the kiosk.

The access screen, to serve as a way for the user to indicate his or her preferences must be accessible to individuals with an arbitrary one or combination of these disabilities in order to effectively serve its purpose. For this reason, the selection of information and the inputting of preferences to the access screen are allowed in a number of different ways.

In one embodiment, the access button 20 is first pressed to invoke the access screen 200. Alternatively, the access screen 200 may be a default screen that occurs whenever access by a previous use is terminated, for example, through lack of use for a fixed period of time. Referring still to FIG. 10, the active area 18 of the touch panel 16 includes a single text block 50 at the top of the active area 18 extending from the left to right side of the screen. Below the text block are positioned a set of five horizontal bars forming virtual buttons 46 having sensitive areas extending the full width of the screen. The shape of these virtual buttons 46 is intended to permit these buttons to be activated by a sweeping of a finger from top to bottom of the screen without regard to its horizontal positioning. Each button displays an internal legend 49 which may be written text or a picture intended to communicate information about the buttons function.

Quick Read Feature

Figure 12:
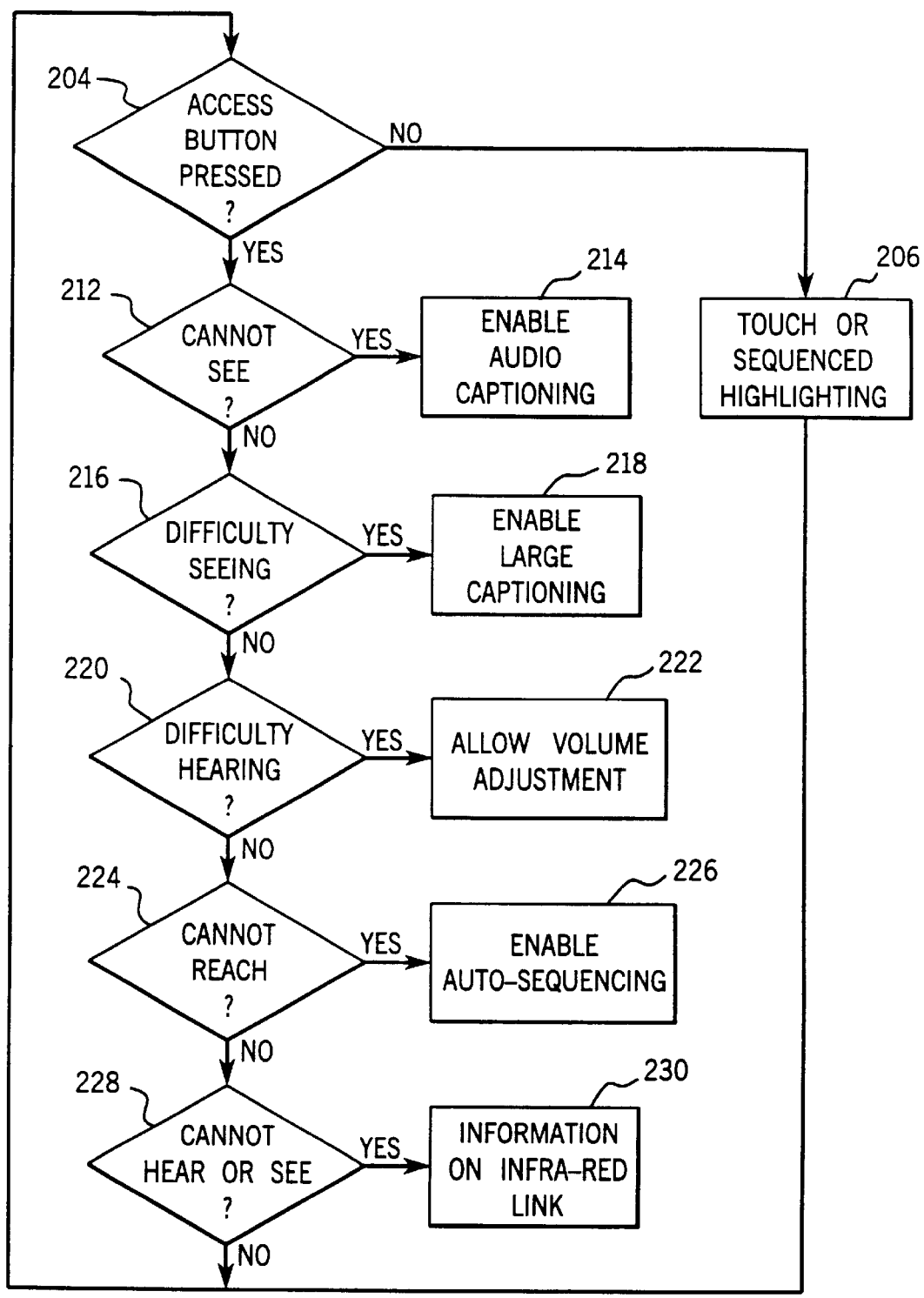
FIG. 12 is a flow chart depicting the operation of the computer in FIG. 1 with respect to the access screen of FIG. 10.

Referring to FIG. 12, after the initiation of the access screen 200, at decision block 204, the microprocessor checks to see if the access button has been pressed again after the access screen 200 has been displayed. Initially, the access button 20 will not have been pressed again because the access screen 200 has just been displayed and the user must react to the information of that screen. In this case, the program moves to process block 206 and the fields on the access screen (text block 50 and virtual buttons 46) are highlighted in series for a period of time determined by an internal timer implemented in software. The time is set to be sufficient for completion of a spoken version of the button's legend 49 as will be described. This timed highlighting of the buttons can at any time be overridden by an actual touching of the buttons 46 or 50 and thus individuals who are capable of using the buttons 46 or 50 either because their disability does not affect use of the buttons 46 or they are familiar with the placement of the buttons 46 and can immediately select those buttons 46 or 50 relevant to them.

The highlighting of the fields involves the simultaneous communication of the information of the button in several ways. First, the legend 49 of the button 46 including additional text not necessarily displayed on the button 46 is spoken through the sound card 34. In addition and referring to FIG. 11, a caption 210 may be positioned near button 46 (preferably above it so as not to interfere with the natural progression of the user's reading of the button legends. The overlapping of the caption 210 and button 46 provide linkage between the caption 210 and the button 46, but because the caption 210 is not touch sensitive, its boundary is arbitrary. Thus, the caption 210 may include larger and additional text from that of the legend 49 and is not constrained by the boundary of the button 4 which as described, defines the region of sensitivity of the button to a touch.

In cases where caption 210 contains the legend of the button 46 in a different language, this ability to arbitrarily size the caption 210 permits the caption 210 to accommodate the different form factors of the text in other languages, for example, the vertical lines of Japanese characters.

The highlighting with the caption 210 may also include a change in the visual appearance of button 46. For example, a field reversal where the lettering becomes light and the background becomes dark.

This sequencing continues until the access button is pressed at decision block 204. This pressing of the access button 20 detected a decision block 204 activates the particular button 46 being highlighted. This is true whether the highlighting is in response to a touching of the button on the screen or a result of the periodic sequencing through the buttons 46 by the computer based on a predetermined time interval that may be selected by the user. Users who may not be able to reach or accurately touch the buttons 46 will wait until it is highlighted by the computer and then will press the access button 20. The blind may also choose to simply wait until the legend of the button 46 that they desire is read during the computer sequencing to press the button 20. The spoken text for each button 4 concludes with the statement that the access button 20 should be pressed now if that button 46 is to be selected. Alternatively, blind individuals may speed the highlighting sequence by sweeping their finger up and down across the buttons 46 in much the same manner as that described with respect to the speed list 150 discussed above. By listening to the spoken legends the proper button is located and the access button is pressed. Individuals who can see and read the legends of the virtual buttons, e.g., deaf individuals, may simply press the desired virtual button at which time the caption 210 will instruct them to press the access button 20.

When the access button 20 is pressed the program proceeds to determine which of the particular buttons 46 was highlighted at that particular time.

The program first checks to see if the button 46 describing an inability to reach or activate the touch buttons 46 is highlighted. This button 46 is placed first so that individuals with a physical impairment will not have to wait long in the highlighting sequence until a button 46 indicating this problem is highlighted. The highlighting of this button 46 is detected at process block 224. Activating this feature by pressing the access button 20 enables an automatic sequencing for subsequent touch screens, indicated by process block 226, in which the buttons on those screens are automatically highlighted in sequence (similar to the access screen) so that a selection may be made by waiting for the desired button to be highlighted and pressing the access button 20. An additional screen (not shown) may also permit the user to change the speed of the sequential highlighting or to change the mode of the sequencing. In one alternative mode, the sequencing is driven by a separate button from the access button 20 (not shown) which is pressed to increment the sequence more rapidly. The separate button may be a surface of the active area 18 of the touch screen.

The program next checks to see if the button 46 describing an inability to see the kiosk screen has been highlighted, as indicated at decision block 212. If this button was highlighted, the audio cues and button pressing logic described above with respect to FIGS. 5–7 may be invoked for future screens as well as the speed list 150. The enabling is indicated by process block 214 and accomplished by flags within the program that activate this feature until the user has concluded with his or her interaction with the touch screen system 10.

If the button 46 is highlighted, detected at decision block 216, indicating a difficulty seeing the kiosk screen (as opposed to an inability to see the kiosk screen) then at process 218, a "quick read feature to be described below is enabled or the features described above with respect to process block depending on additional user choices provided in a separate screen.

Individuals with difficulty hearing will press the access button 20 when the virtual button 46 highlighted, as detected at process block 220, indicates a difficulty in hearing. Pressing the access button 20 at this time moves the user to a volume control screen allowing adjustment of the volume level produced by the sound card 34 as indicated at process block 222 using conventional touch screen buttons in lieu of conventional volume controls. The user will also have the option of having written captions for any multi-media sounds provided by the system. An inductive loop feature, allowing those with aids for hearing that permit the detection of inductive signals such as are produced by many telephone systems, to receive the audio information inductively can also be enabled in response to this selection.

Individuals who can neither see nor hear may use an infrared line for personal communication. Information on such a hook-up can be obtained by pressing the final button 46 as detected at decision block 228 or continuously via an infrared transmitter (not shown) that remains on during the access screen.

Each of the process blocks 214, 218,222, and 226 also may provide information on the infrared link and on privacy issues related to the features selected by the user, for example the use of a handset (not shown) or headphones connected to a audio jack (not shown), or the turning off of the display screen 12 or the speakers 22.

Figure 13:
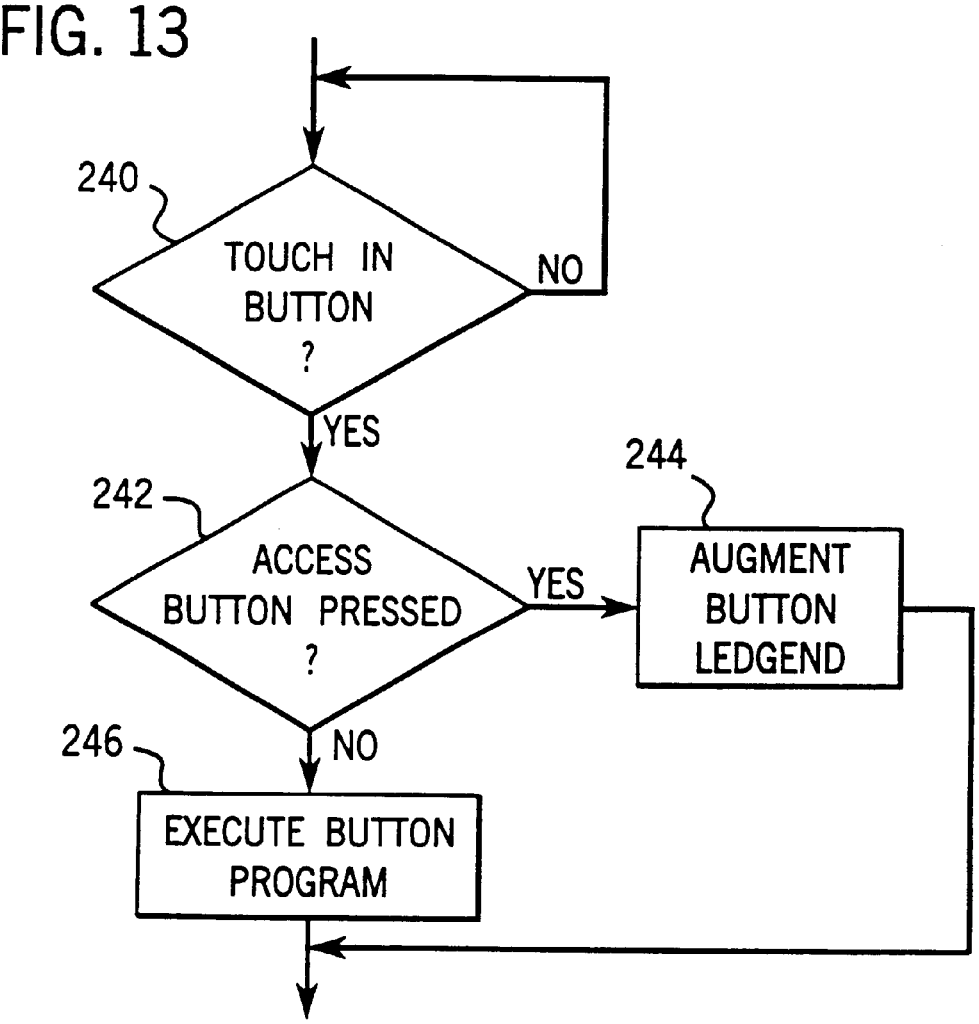
FIG. 13 is a simplified flow chart of the operation of the access button of FIG. 10 in a context other than the access screen of FIG. 10.

The operation of the access screen 200 as described above provides a method for individuals with varied disabilities to use the touch screen system 10, but also provides for efficient and rapid selection of those features need by the user as quickly and as simply as possible. Referring now to FIG. 13, for individuals who can see the screen and the layout of the virtual buttons, but who have trouble interpreting or remembering the legends on the buttons for a relatively few number of those buttons, a captioning of each button may be inappropriately burdensome. Accordingly, the access button 20 being otherwise unused for particular disability, may be used in subsequent screens to provide selective captioning.

Figure 11:
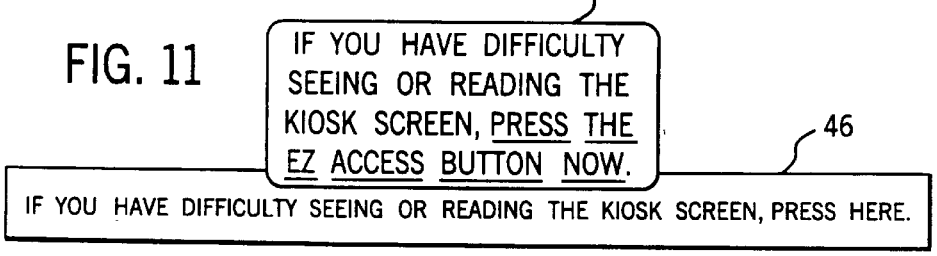
FIG. 11 is a detail of one button of FIG. 10 having a superimposed large type caption.

In this mode of operation, if the access button 20 is being pressed, as determined at decision block 242, when the touch screen system 10 detects a touch point within a virtual button 46, indicated by decision block 240 then the legend of the button is augmented as provided at process block 244. Again, such augmentation may include caption 210 as shown in FIG. 11 elaborating on the legend or a written in a different language and/or a spoken version of the caption in the same or a different language provided by the sound card 34. In cases where the legend is a graphical element, the augmentation may be a description of the element or the underlying function of the button. If the access button 20 is not pressed at the time of a touch within virtual button 46, the program proceeds to process block 246 to simply execute the program associated with the button 46, as is normally the case with a kiosk touch screen system 10.

In this way, an individual largely familiar with the operation o the touch screen may employ it in a conventional manner touching those buttons they wish to activate, but by pressing the access button 20 may cause those buttons not to activate, but instead to augment the description of their legends for greater comprehension.

Reduced Button Set Control Panel Embodiment

Figure 14:
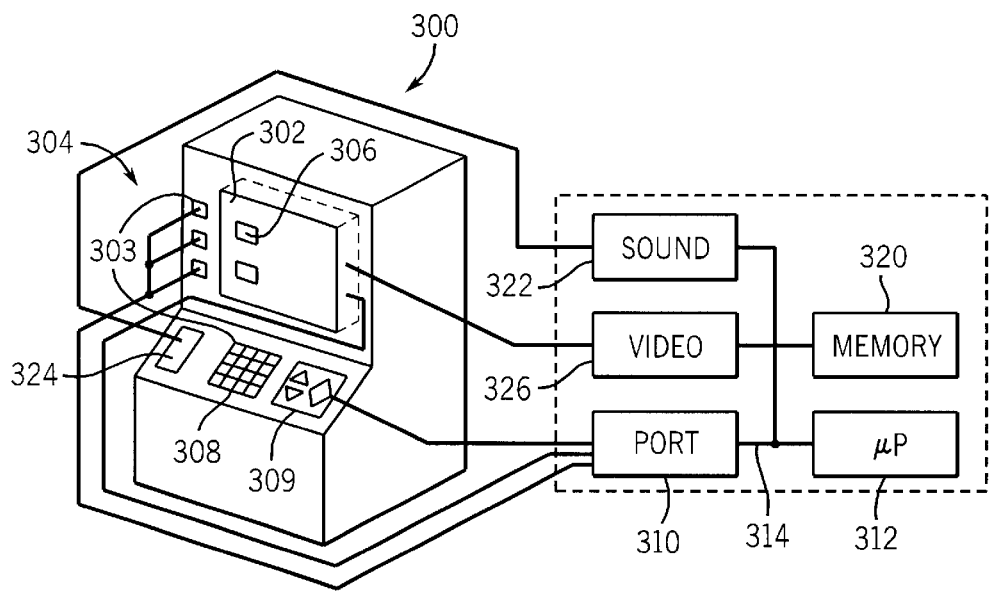
FIG. 14 is a figure similar to that of FIG. 1 showing an example electronic device making use of a reduced button set access panel providing an alternative to standard electronic controls on the device.

Referring now to FIG. 14, an electronic device 300, such as an automatic teller machine, may include a video screen 302 with various standard controls 304 including both mechanical buttons 303 and virtual buttons 306. The latter are displayed on a touch screen of the video screen 302 as is well known in the art and as also described above. Among the mechanical buttons 303 may be pushbuttons flanking video screen 302, a numeric keypad 308, and a reduced button set access panel 309.

Each of these standard controls 304 may communicate with a port 310 communicating with a microprocessor 312 via an internal bus 314. The bus 314 may also communicate with a memory 320, a video board 326 and a sound card 322 per conventional computer architectures.

The memory 320 holds data and programs including a program that will be described below forming part of the present invention. The program may be implemented in a number ways depending on the particular device and so a functional description of the program will be provided such as would allow it to be readily incorporated into standard electronic devices by one of ordinary skill in the art.

The sound card 322 receives data from the bus 314 by virtue of execution of the program by the microprocessor 312 to produce sound communicated to an earphone jack 324 presented at the front of the electronic device 300. The earphone jack 324 provides security or confidentiality as may be desired by the user or required by the manufacturer. It will be understood that the function of the earphone jack can equally be met by the use of speakers or a signal to a user's personal audio device. The video board 326 also receives data over the bus 314 (also generated by execution of the program by the microprocessor 312) to provide video data to the video screen 302.

Figure 15:
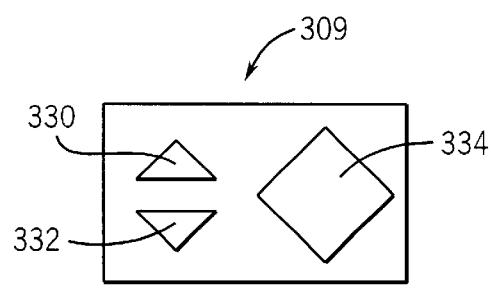
FIG. 15 is a detailed plan view of the reduced button set access panel of FIG. 4 showing triangular up and down buttons and a diamond-shaped access button.

Referring now to FIG. 15, the reduced button set access panel 309 includes three pushbuttons. The first two include an up button 330 and a down button 332. Both of these are triangular in outline so as by touch and sight to present the shape of arrows pointing upward and downward along a generally vertical axis. The orientation of the up button 330 and down button 332 may clearly be varied although ideally consistency is maintained for the benefit of the individuals who need to use this system in a variety of different contexts.

The third button of the reduced button set access panel 309 is an access button 334 that is diamond-shaped, i.e., a square with one diagonal oriented vertically. The access button 334 is preferably green colored with the letters EZ (not shown) on or next to the button.

Generally, these three buttons may fully control the various functions of the electronic device 300 through a mapping process in which the functions of the electronic device 300 are mapped to these three buttons.

Referring now to FIG. 16, the various functions 338 of the electronic device 300 are shown diagrammatically and represent invocable operations by the computer such as may be used to provide data to the electronic device 300 or invoke features of its operation as may be associated with standard controls 304 including both virtual buttons (as shown) or mechanical buttons 303 described above. For example, in an automatic teller machine, those standard controls 304 may select between different screens or instruct the machine to undertake certain transactions like those providing for the withdrawal of money or the determination of an account balance. Generally the functions 338 include no less than all functions of the electronic device 300 as activated by any standard control 304 but are not necessarily organized in a list as depicted.

In the present invention, the functions 338 are related to a virtual list 340 by means of a mapping table 336. The virtual list 340 holds a set of list elements 350 each related to one function 338 of the electronic device 300. Each list element 350 may include a function name and other information about the function 338 either directly or by reference according to methods well known in the art. As will be described further below, list elements 350 may be "selected" and then "activated" without resort to the standard controls 304.

Referring now to FIGS. 16 and 17 the virtual list 340 may be organized into a number of sub lists 340a–340c organized in hierarchical fashion. A root sub list 340 has elements 350 that related to functions 338 that when activated cause a movement between the root sub list 340a and a branch sub list 340b Movement refers in this case to a changing of the selection of the list element 350 from the elements of the root sub list 340a to a predetermined list element 350 of the branch sub list 340b. In the case where the sub lists 340a–340c correspond to functions grouped together by virtue of their being associated with functions of virtual buttons 306 grouped on a single screen, movement between the sub lists 340a–340c may be accomplished by the functions 338 that move between screens of the corresponding of virtual buttons 306. On the other hand, the sub lists need not be organized according to the organization of virtual buttons 306 on the screen 302 and in this case the functions 338 moving between sub lists 340a to 340c are "phantom functions" invocable only from the virtual list 340 as will be described.

The virtual list 340 (or each sub list 340a 340c) includes a top of list delimiter 342 and a bottom of list delimiter 344 which do not have corresponding functions 338 accessible to the user by the standard controls 304 and thus are also phantom functions. These top and bottom of list delimiters 342 and 344 assist the user who is relying on audio cues as will be described in navigating through the virtual list 340.

The bottom of list delimiter 344 may be augmented with additional phantom functions (not shown), including those that move between sub lists 340a–340c and a menu function 346 which provides control of access features of the electronic device not needed by some users of the standard controls 304. These menu items may include volume adjustment of the sound card 332, for example, or other special features as will be described below. An additional phantom function is one that provides an explanation of the virtual list 340 generally and one which provides help with the access features. These will be described in more detail below. Again these functions are not accessible through the standard controls 304.

Each sub list 340a–340c is held in memory 320 and is arbitrary in length but is generally kept short for ease in navigation through the possibly many functions 338. Ideally the list 340 and its sub lists 340a–340c are organized in a logical way such as a typical chronological access of the particular functions needed by a user.

The mapping table 336 may be a separate structure as shown, or may be implicit in the data held in the list elements 350 each which may provide information mapping it to a function 338. In any case, the mapping table 336 maps a function identifier, such as may be a code provided to the microprocessor 312 to invoke that function 338, to a corresponding list element 350 of the virtual list 340 so that selecting a list element 350, as will be described, will invoke the identified function 338. In this way, a wide variety of different functions 338 related to standard controls 304 with different spatial orientations and button types may be incorporated into the structure of the virtual list 340.

Referring now to FIG. 14, generally once all functions 338 have been mapped to the virtual list 340, the reduced button set access panel 309 can be used to navigate through the functions 338 by the simple means of pressing the up button 330 or the down button 332. With each momentary pressing of the up or down button 330 or 332, a "selected" particular list element 350' corresponding to a function 338 changes upward or downward.

Initially or when a new sub list 340a–340c is encountered, a predetermined list element 350 will be selected, typically the list element 350 beneath the top of list delimiter 342. The selection can be then moved upward by one or downward by one according to the up button 330 or down button 332 pressed.

At each change of list element 350, by pressing the up button 330 or the down button 332, a caption stored in or otherwise associated with the list element 350 will be announced via the sound card 322. This is also the case when top of list delimiter 342 and bottom of list delimiter 344 are encountered. A "button pressed" sound such as a click may also be played.

Generally these and other sound events are associated with corresponding visual events on the video screen 302 for the purposes of those with some vision. All spoken dialog may have a text caption displayed on the video screen 302 which may be turned on and off through an options menu not generally accessible except through the reduced button set access panel 309. The text that is announced with the selection of the list elements 350 is generally the text that would be on the standard control 304 however additional phantom functions may be added to read text that is otherwise on the screen or the product including its housing.

When the current selection is the top of list delimiter 342 and the up button 330 is pressed, the caption bottom of list can be announced with no additional action being taken until the access button 334 is pressed whereupon the selection moves to the bottom of list delimiter 344 or in some options, the list element 350 just above the bottom of list delimiter 344. Likewise when the selection has reached the bottom of list delimiter 344 and the down arrow is pressed, the bottom delimiter caption bottom of list can be announced with no further action is taken until the access button 334 is pressed whereupon the selection moves to the top of the virtual list 340. The intent of this option is to reduce confusion caused by rollover of the virtual list 340 yet to allow selection of the list elements 350. Another option is to have the program prevent rollover entirely in which case the options to jump to the top or bottom of list can be provided Once a list element 350 is selected, the access button 334 may be pressed and released. Upon release, the electronic device 300 behaves as if the standard control 304 corresponding to the particular function 338 of the selection of the virtual list 340 had been pressed. Some functions 338 cause a change of screen display and, as mentioned, can likewise invoke a new virtual list 340. For an example, electronic device that is a bank teller machine, the functions 338 may include providing account balances or dispensing cash, or the like.

It can be seen that a wide variety and complex arrangement of standard controls 304 can thus be accessed and controlled by the relatively small, reduced button set access panel 309. In one embodiment, these basic operations may be augmented as provided in the following table.

TABLE I

| User Action | Results |
| --- | --- |
| First momentary press of up button, down button or access button. | Instruction on how to use access panel. |
| Up button pressed momentarily. | Move up to next element in list. |
| Up button held down for two seconds. | Move to top delimiter. |
| Down button pressed. | Move down to next element in list. |
| Down button held for two seconds. | Move down to bottom delimiter. |
| Access button pressed momentarily. | Activate element in list. |
| Up and down buttons pressed while the access button is held down. | Provide descriptions of the elements in the list. |

By activating the indicated function 338 upon the release of access button 334 rather than the pressing of access button 334, the pressing of access button 334 may be reserved to provide "user-help" instructions in a manner similar to that described above with respect to FIG. 13. In particular, when access button 334 is pressed, and any other standard control 304 is pressed, the controls ability to actuate a function 338 is suspended and instead an explanation of the purpose or context of the standard control 304 is provided. A similar feature may be provided for functions on the virtual list 340 as will be described below A "layered-help" approach is offered in this regard that is particularly valuable when the help instructions are given through spoken messages delivered from the computer by the sound card. Upon an initial utilization of the help feature, say by holding the access button 334 down and pressing one of the standard controls 304 of the numeric keypad 308, the program will provide a short name and status of the standard control 304. Without releasing the access button 334 if the same standard control 304 is again pressed, more detailed help information may be provided. This same feature can be provided for "state" type controls in which more than two states ("pressed" or "unpressed", "on" or "off") can be implemented. In this case, the help feature may indicate a current state of the control (e.g. a volume level or the like).

While the invention is not limited to a particular schema for the help, a general structure is provided in the following table where each layer is a repeated activation of a standard control 304 while the access button 334 remains pressed.

TABLE II

| HELP LAYER | HELP SCOPE |
| --- | --- |
| Layer 0 | Name of the function associated with the control and quick status, if any |
| Layer 1 | A description of the function of the control and longer status if necessary |
| Layer 2 | How the control can be used |
| Layer 3 | Special instructions particular to the control |
| Layer 4 | Related controls and functions |
| Layer 5 | Reference to a user manual page number |
| Layer 6 | Loop back to layer 0 |

Any number of layers can be provided.

A more detailed explanation of the operation of the layered help feature as implemented in software by the microprocessor is provided in the following table.

TABLE III

| USER ACTION | RESULT |
| --- | --- |
| Access button held down | No action unless access button is held for five seconds without touching any other button and the device is not performing an action that requires that the access button be down in which case the user is told to release the button. |
| Access button held down and control button pressed momentarily. | Layer zero of help provided. |
| Access button held down and control button held down. | Layers zero through layer N are provided. Each layer is separated by a brief pause of greater than one second. When layer zero is being given, the speech will continue if the target button is released. For all other layers, the speech is silenced when either button is released. This mode can move directly into the next if the access is held down and the target button is pressed again. |
| Access button is held down and a control button is pressed a number of times. | Layers zero through N are provided upon each button pressing. The speech continues at each layer unless the access button is lifted and then it ends immediately except for layer zero. |
| Access button is held down and the control button is pressed and then up or down buttons pressed. | Layers of help are repeated with each press of the up button or skipped forward with each press of the down button. Lifting a finger from the access button causes speech to end immediately. |
| A standard control button is pressed and held down. | Standard function associated with that control is performed. Any pressing of a control button while layered help speed is being provided cuts the speech off at that time. |
| A control button is held down and any of the access up or down buttons is momentarily pressed or held down. | The user may be notified what the proper actions are. |

A fourth or additional buttons can also be used with this technique to provide faster ways of accessing choices that would otherwise be accessed via the list to make some applications easier to use. For example, a fourth button may be used which would activate a "back" or "escape" function.

Referring now to FIG. 18, in certain cases it will be desired to make use of existing controls to implement the reduced button set access panel 309'. A common such structure is that of four controls arranged at vertices of a diamond with indicia or providing outwardly pointing arrows. Such structures are used for cursor control or the like. In this case, the right pointing arrow can be enlisted to provide the function of the access button 334' while the up and down arrow buttons can form the up and down buttons 330' and 332' respectively. The use of these buttons requires typically only a programming change in the electronic device and thus can be implemented at a low marginal cost making up in part for the less recognizable structure.

The forth button 360 of this structure, corresponding generally to the left arrow button, may be enlisted to provide a navigation tool for hierarchical sub lists 340a–340c. Referring to FIG. 17, once the user find his or herself at a sub list 340c being several slayers below the root sub list 340a it may be difficult to navigate back upward to the sub list 340b and 340a. Such upward navigation requires finding the functions 338 that allow upward movement, such functions which may not necessarily otherwise be easy to find. Accordingly the button 360 may provide for a mapping to an up-hierarchy functions (such as may be a phantom function if not enabled normally on the electronic device 300) that moves the user up the hierarchy regardless of initial location.

This fourth button may also be added to the left of the buttons 330 and 332 of the reduced button set access panel 309 of FIG. 15 for similar purpose.

The above description has been that of a preferred embodiment of the present invention. It will occur to those that practice the art that many modifications may be made without departing from the spirit and scope of the invention. Clearly, the present invention is not limited to use with full sized computer terminals but may be used on any electronic device, for example, cellular telephones, personal digital assistants ("PDA's") or various pieces of standard office equipment such as copy or fax machines. The present technique is also applicable to future HMI including those which project virtual buttons on a wall or the like and monitor a user's finger motions to deduce button "pressings". Here the reduced buttons set access panel 309 may be a plate having tactile features embedded in the projection surface. In order to apprise the public of the various embodiments that may fall within the scope of the invention, the following claims are made.

We claim:

1. An interface system to an electronic device providing access for people with disabilities, the interface system comprising:
   a first set of electronic controls;
   a second set of electronic controls including an access switch, an up switch and a down switch;
   an electronic computer communicating with the first and second set of electronic controls and executing a stored program to:
   (i) respond to activation of ones of the first set of electronic controls without activation of the access switch to invoke functions of the electronic device;
   (ii) respond to activation of ones of the first set of electronic controls with activation of the access switch to provide information about the function invoked by the activated one of the first set of electronic controls;

(iii) mapping the functions of the electronic device invocable by the first set of electronic controls to list elements of a virtual list such that the functions invocable by the first set of electronic controls can be invoked using the second set of electronic controls by selecting the desired function directly from said virtual list;

(iv) respond to activation of the up switch to change a selected function of the virtual list upward by one list element;

(v) respond to activation of the down switch to change the selected function of the virtual list downward by one list element;

(vi) respond to a deactivation of the access switch to invoke the selected function of the virtual list.

2. The interface system of claim 1 wherein the electronic computer further operates to respond to activation of the up switch and down switch to notify the user of the changed selected function.

3. The interface system of claim 2 wherein the electronic computer communicates with an audio system and wherein the information about the selected function of the virtual list and the notification of the user of the changed selected function is in the form of spoken words.

4. The interface system of claim 1 wherein the access switch is a pushbutton and wherein the electronic computer further operates to define activation of the access switch as pressing of the pushbutton.

5. The interface system of claim 1 wherein the virtual list includes at least one menu element, and wherein the electronic computer further operates such that the menu element is:

not invocable by the first set of controls, and invocable by the access switch when selected to provide functions related to access of the electronic device for those with disabilities.

6. The interface system of claim 1 wherein the menu item provides a persistent operating state of the electronic device so that information about the selected function of the virtual list is provided after activation of the access switch.

7. The interface system of claim 1 wherein the virtual list includes sub lists linked in a hierarchical fashion and wherein at least one function moves the selection between sub lists in the hierarchy.

8. The interface system of claim 7 wherein the second set of electronic controls further includes a back switch and wherein the electronic computer further operates to move the selection upward in the hierarchy when the back switch is selected.

9. The interface system of claim 8 wherein activating the access switch provides an acknowledgement signal.

10. An interface system to an electronic device providing access for people with disabilities, the interface system comprising:

a first set of electronic controls;

a second set of electronic controls including an access switch, an up switch and a down switch;

an electronic computer communicating with the first and second set of electronic controls and executing a stored program to:

(i) respond to activation of ones of the first set of electronic controls without activation of the access switch to invoke functions of the electronic device;

(ii) respond to activation of ones of the first set of electronic controls with activation of the access switch to provide information about the function invoked by the activated one of the first set of electronic controls;

(iii) mapping the functions of the electronic device invocable by the first set of electronic controls to list elements of a virtual list;

(iv) respond to activation of the up switch to change a selected function of the virtual list upward by one list element;

(v) respond to activation of the down switch to change the selected function of the virtual list downward by one list element;

(vi) respond to a deactivation of the access switch to invoke the selected function of the virtual list;

wherein the virtual list includes at least one delimiter list element at an end of the virtual list, and wherein the electronic computer further operates such that the delimiter is:

not invocable by the first set of controls, and invocable by the access switch when selected to provide an indication of the location of the selection at the end of the virtual list.

11. The interface system of claim 10 wherein the electronic computer communicates with an audio system and wherein the indication of the location of the selection at the end of the virtual list is in the form of spoken words.

12. The interface system of claim 10 wherein the electronic computer further operates so that a pressing one of the up and down switches when the selection is at the end of the virtual list moves the selection to a beginning of the virtual list.

13. The interface system of claim 12 wherein the electronic computer further operates so that a pressing of the one of the up and down switches when the selection is at the end of the virtual list moves the selection to the beginning of the virtual list only after an acknowledgment signal by the user.

14. An interface system to an electronic device providing access for people with disabilities, the interface system comprising:

a set of electronic controls;

an access switch;

an audio circuit;

an electronic computer communicating with the set of electronic controls, the access switch and the audio circuit and executing a stored program to:

(i) map the functions of the electronic device invocable by the set of electronic controls to list elements of a virtual list such that a function selected from said virtual list can be invoked using the access switch;

(ii) respond to activation of a control of the set of electronic controls without activation of the access switch to invoke functions of the electronic device associated with the activated control;

(iii) respond to a primary activation of the control with concurrent activation of the access switch to provide to a user a first spoken text message indicating of the operations of the electronic device associated with the activated control;

(iv) respond to a secondary activation of the control prior to deactivation of the access switch after the primary activation to provide to a user a second spoken text message indicating the operation associated with the activated control different from the first spoken text message.

15. The interface system of claim 14 wherein the electronic computer further operates to provide additional and different spoken messages of the operations associated with the activated electronic control with subsequent activations of the control prior to deactivation of the access switch after the secondary activation.

16. An interface system to an electronic device providing access for people with disabilities, the interface system comprising:
- a set of electronic controls;
- an access switch;
- an audio circuit;
- an electronic computer communicating with the set of electronic controls, the access switch and the audio circuit and executing a stored program to:
  - (i) respond to activation of a control of the first set of electronic controls without activation of the access switch to invoke functions of the electronic device associated with the activated control;
  - (ii) respond to a primary activation of the control with concurrent activation of the access switch to provide to a user a first spoken message indicating of the operations of the electronic device associated with the activated control;
  - (iii) respond to a secondary activation of the control prior to deactivation of the access switch after the primary activation to provide to a user a second spoken message indicating the operation associated with the activated control different from the first spoken message;
- wherein the electronic computer further operates so that the primary, secondary and subsequent activations are associated with spoken messages selected from the group of (1) a name of the activated control and summary state of the operations of the activated control; (2) a function of the activated control and detailed state of the operation of the activated control; (3) how the activated control is used; (4) special instructions related to the activated control; (5) related controls; and (6) reference to a user manual page number.

17. An interface system to an electronic device providing access for people with disabilities, the interface system comprising:
- a set of electronic controls;
- an access switch;
- an audio circuit;
- an electronic computer communicating with the set of electronic controls, the access switch and the audio circuit and executing a stored program to:
  - (i) respond to activation of a control of the first set of electronic controls without activation of the access switch to invoke functions of the electronic device associated with the activated control;
  - (ii) respond to a primary activation of the control with concurrent activation of the access switch to provide to a user a first spoken message indicating of the operations of the electronic device associated with the activated control;
  - (iii) respond to a secondary activation of the control prior to deactivation of the access switch after the primary activation to provide to a user a second spoken message indicating the operation associated with the activated control different from the first spoken message;
- wherein the spoken message is selected in order from the group consisting of group of (1) a name of the activated control and summary state of the operations of the activated control; (2) a function of the activated control and detailed state of the operation of the activated control; (3) how the activated control is used; (4) special instructions related to the activated control; (5) related controls; and (6) reference to a user manual page number.

18. The interface system of claim 14, wherein the electronic computer further operates to provide a spoken message indicating to the user of the operation of the access switch when the access switch is activated without activation of a control of the electronic controls.

19. An interface system to an electronic device providing access for people with disabilities, the interface system comprising:
- a set of electronic controls;
- an access switch;
- an audio circuit;
- an electronic computer communicating with the set of electronic controls, the access switch and the audio circuit and executing a stored program to:
  - (i) respond to activation of a control of the first set of electronic controls without activation of the access switch to invoke functions of the electronic device associated with the activated control;
  - (ii) respond to a primary activation of the control with concurrent activation of the access switch to provide to a user a first spoken message indicating of the operations of the electronic device associated with the activated control;
  - (iii) respond to a secondary activation of the control prior to deactivation of the access switch after the primary activation to provide to a user a second spoken message indicating the operation associated with the activated control different from the first spoken message;
- further including a down switch and wherein the electronic computer further operates so as to respond to an activation of the down switch after the secondary activation of the control prior to deactivation of the access switch provide to the user a third spoken message indicating the operation associated with the activated control different from the second spoken message.

20. An interface system to an electronic device providing access for people with disabilities, the interface system comprising:
- a set of electronic controls;
- an access switch;
- an audio circuit;
- an electronic computer communicating with the set of electronic controls, the access switch and the audio circuit and executing a stored program to:

(i) respond to activation of a control of the first set of electronic controls without activation of the access switch to invoke functions of the electronic device associated with the activated control;

(ii) respond to a primary activation of the control with concurrent activation of the access switch to provide to a user a first spoken message indicating of the operations of the electronic device associated with the activated control;

(iii) respond to a secondary activation of the control prior to deactivation of the access switch after the primary activation to provide to a user a second spoken message indicating the operation associated with the activated control different from the first spoken message;

further including an up switch and wherein the electronic computer further operates so as to respond to an activation of the up switch after the secondary activation of the control prior to deactivation of the access switch provide to the user with the first spoken message again.

* * * * *

UNITED STATES PATENT AND TRADEMARK OFFICE
CERTIFICATE OF CORRECTION

PATENT NO. : 6,624,803 B1
DATED : September 23, 2003
INVENTOR(S) : Gregg C. Vanderheiden et al.

It is certified that error appears in the above-identified patent and that said Letters Patent is hereby corrected as shown below:

Column 11,
Line 42, change "di" to -- $d_1$ --.

Column 12,
Line 1, change "46" to -- 46' --.

Signed and Sealed this

Twenty-second Day of June, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,624,803 B1  
DATED : September 23, 2003  
INVENTOR(S) : Gregg C. Vanderheiden et al.

Page 1 of 1

It is certified that error appears in the above-identified patent and that said Letters Patent is hereby corrected as shown below:

Column 1,
Line 16, after "STATEMENT REGARDING FEDERALLY SPONSORED RESEARCH OR DEVELOPMENT", insert -- This invention was made with United States government support awarded by the following agencies: DED H133E30012 and H133E980008.
The United States has certain rights in this invention. --

Signed and Sealed this

Twenty-eighth Day of September, 2004

JON W. DUDAS
*Director of the United States Patent and Trademark Office*